United States Patent [19]

Shiga et al.

[11] E Patent Number: Re. 32,542

[45] Reissued Date of Patent: Nov. 10, 1987

[54] MOLDED PRODUCTS OF POLYPROPYLENE

[75] Inventors: Akinobu Shiga, Ichihara; Kiyoshi Matsuyama, Niihama; Masahiro Kakugo, Narashino; Yukio Naito; Seiichiro Ima, both of Ichihara, all of Japan

[73] Assignee: Sumitomo Chemical Company, Limited, Osaka, Japan

[21] Appl. No.: 927,219

[22] Filed: Nov. 5, 1986

Related U.S. Patent Documents

Reissue of:

[64] Patent No.: 4,283,463
Issued: Aug. 11, 1981
Appl. No.: 103,133
Filed: Dec. 13, 1979

[30] Foreign Application Priority Data

Dec. 13, 1978 [JP] Japan ..... 53-155973
Dec. 29, 1978 [JP] Japan ..... 53-165134

[51] Int. Cl.[4] ..... B32B 27/32; C08F 110/06

[52] U.S. Cl. ..... 428/512; 526/348.1; 526/351

[58] Field of Search ..... 428/512; 526/348.1, 526/351

[56] References Cited

U.S. PATENT DOCUMENTS

| | | | |
|---|---|---|---|
| 4,053,697 | 10/1977 | Asada et al. | 526/351 |
| 4,182,852 | 1/1980 | Shiga et al. | 526/351 |
| 4,185,148 | 1/1980 | Sato et al. | 526/348.1 |
| 4,195,145 | 3/1980 | Shiga et al. | 526/351 |

*Primary Examiner*—Paul R. Michl
*Attorney, Agent, or Firm*—Sughrue, Mion, Zinn, Macpeak, and Seas

[57] ABSTRACT

A molded product of polypropylene having an isotactic pentad fraction of the boiling heptane insoluble portion of at least about 0.955 and a boiling heptane solubles content of about 2.0 to 9.0% by weight. The molded products include a stretched film, insulating materials for electrical equipment, etc.

21 Claims, No Drawings

MOLDED PRODUCTS OF POLYPROPYLENE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to molded products of polypropylene which have excellent physical properties such as stiffness, heat resistance and oil resistance, and, particularly, to stretched films and molded products of polypropylene for electrical insulation.

2. Description of the Prior Art

Polypropylenes are thermoplastic resins which generally have good mechanical strength, heat resistance, moisture resistance, etc. They are molded, alone or in a composition with various other materials, into various articles such as structural materials, films, containers, fibers and so on by molding procedures such as injection molding, extrusion molding, etc. These molded articles find wide application in automobile parts, packaging materials, electrical components and equipment, carpets, etc.

However, polypropylenes conventionally used do not necessarily have satisfactory mechanical strength, heat resistance and so on in certain applications. For instance, biaxially stretched polypropylene films have inferior stiffness to cellophane and polyester films although they are packaging materials having excellent optical properties (such as transparency, luster, etc.) and moisture resistance. As a result polypropylenes are not suitable for use in automatic packaging, especially overlap packaging and twist packaging, leading to a great limitation on their use. Moreover, even in cases where the polypropylene films can be made much thinner from the standpoint of moisture resistance and other properties, it is inevitably necessary to increase their film thickness to obtain stiffness. This is not only uneconomical but is also an obstacle to the miniaturization of electrical components such as dry condensers wherein a polypropylene film is used.

Because of their excellent dielectric properties and high electrical breakdown strength, polypropylenes are now commonly used as insulating materials for electrical equipment such as extra high voltage cables and condensers. However, in using polypropylenes as insulation materials in electric equipment, problems occur in that polypropylene films swell in the insulation oils used in the electrical equipment (such as mineral oil and hydrocarbon insulation oil, e.g., alkylbenzene, alkylnaphthalene, diaryl ethane and the like), thereby increasing the film thickness. The increase in the thickness of the film due to the swelling leads to a quite serious problem as hereinafter explained. Further, the polypropylene dissolves in the insulation oil thereby increasing the viscosity of the insulation oil.

In the case of a polypropylene laminated paper in which polypropylene is laminated on a kraft paper, the increase in the thickness of the polypropylene film leads first to a reduction in the mobility of the insulation oil contained in an insulation layer. Mobility is needed to compensate for swell and contraction of the insulation oil with changes in the temperature of the electrical equipment.

In hitherto used electrical equipment in which a kraft paper is used as an insulation, the insulation oil can pass through the thickness of the kraft paper because the kraft paper is porous. In the polypropylene laminated paper, however, the insulation oil cannot pass. Therefore, the insulation oil must flow by passing through the spaces or pores on the surface of the kraft paper or in the inner portion thereof. Thus, the mobility of the insulation oil is inherently inferior even when there is not an increase in the thickness of the polypropylene layer. In this case, however, the use of a kraft paper having a relatively low density ensures oil mobility to the extent that it is usually required in conventional electrical equipment. Nevertheless, if the polypropylene layer swells and increases in thickness, the kraft paper is compressed thereby decreasing the spaces or pores, and ultimately the necessary fluidity of the insulation oil cannot be maintained.

Second, the layers of tape in contact with each other around a cable are pressed more firmly through the compression of the kraft paper upon swelling of the polypropylene, and the ability of the tapes to slide becomes difficult. This leads to the problem that the application of bending onto the cables, etc., in the installation thereof produces wrinkles on the tapes. These phenomena become more marked as the extent to which the polypropylene layer swells increases and the increase in the film thickness increases, and as the ratio of the thickness of the polypropylene layer to the total thickness of the polypropylene laminated paper increases. Thus, if the polypropylene layer swells to a greater extent, the ratio of the polypropylene layer to the total of the polypropylene laminated paper must be made smaller.

From the standpoint of electrical properties, however, it is preferred that the ratio of the polypropylene layer to the total thickness of the laminate, which has excellent dielectric properties, etc., is high. Thus, an insulation material consisting of a polypropylene film is most preferred. For these reasons, in obtaining electrical components of excellent characteristics, it is important to minimize the swelling property of the polypropylene layer.

Polypropylenes having a relatively low molecular weight are dissolved in the insulation oil from the polypropylene layer and increase the viscosity of the insulation oil, which deteriorates the fluidity and mobility of the oil in the insulation layer. Therefore, it is also important to minimize the increase in the vicosity of the insulation oil due to the polypropylene layer.

In order to solve the above-described problems, an attempt to improve physical properties such as stiffness of the molded products of polypropylene has been made. One of the procedures proposed is to increase the isotactic index (I.I). In accordance with this procedure, those polypropylenes produced by decreasing the amount of the atactic portion produced during polymerization of polypropylene or by removing the atactic portion by washing with a solvent are employed. This procedure, however, is directed only to increasing the isotactic index and the stiffness and the degree of swelling are insufficiently improved. Furthermore, the viscosity of the insulation oil is markedly increased. Particularly at relatively high temperatures no improvement is observed.

Another procedure is disclosed in Japanese Patent Publication No. 14062/64, in which a nucleating agent is added to polypropylene. Another procedure is disclosed in Japanese Patent Publication No. 11656/72, in which a modifying agent such as a styrene polymer and the like is added to polypropylene. However, in accordance with the procedure disclosed in Japanese Patent Publication No. 14062/64, the optical and electrical properties of the stretched film are deteriorated. In accordance with the procedure disclosed in Japanese Patent Publication No. 11656/72, a large amount of the modifying agent is added which deteriorates the heat resistance, oil resistance and electrical properties of the polypropylene, and increases costs. It can be readily understood that with these procedures it is quite difficult to maintain the inherent characteristics of polypropylene because the stiffness of polypropylene is improved by the addition of foreign substances.

As another procedure for obtaining stretched films of high stiffness, it has been proposed to increase the stretching ratio. In this procedure, however, the stretching is carried out under severe conditions. Therefore, troubles such as film splitting during stretching are likely to take place and the productivity is poor.

One procedure of controlling the swelling property of polypropylene is by subjecting a laminated paper to heat treatment in a vacuum at a temperature below the melting point of polypropylene. In accordance with this procedure, however, the swelling property is insufficiently improved, and the viscosity of the insulation oil is thus markedly increased. Furthermore, since the heat treatment is carried out under specific conditions, the cost increases and this procedure is thus disadvantageous from the economic standpoint.

Based on the assumption that it is not possible to eliminate all swelling and that some increase in thickness resulting from swelling in commercially available electrical equipment in which polypropylene is employed must occur, Japanese Patent Application (OPI) No. 96083/78 (The term "OPI" as used herein refers to a "published unexamined Japanese patent application") discloses a procedure in which a plurality of polypropylene layers are formed and a layer capable of absorbing the increase in thickness is provided between the polypropylene layers to thereby reduce the apparent increase in the thickness of the total laminated paper. Although this procedure is very effective in decreasing the expansion due to swelling it has the disadvantage that the structure of the laminated paper is made complicated, and the production is thus more expensive.

SUMMARY OF THE INVENTION

An object of this invention is to provide molded polypropylene products having high stiffness and excellent oil resistance and heat resistance.

Another object of this invention is to provide stretched polypropylene films having high stiffness and excellent oil resistance and heat resistance.

Another object of this invention is to provide an insulation material comprising polypropylene film which is used in electrical equipment.

These objects are attained by employing polypropylenes in which the isotactic pentad fraction of the boiling heptane insoluble portion is about 0.955 or more, and the content of the boiling heptane soluble portion is about 2.0 to 9.0% by weight. That is to say, the use of these polypropylenes enables production of molded products having high stiffness and excellent oil resistance (e.g., swelling properties and a change in the viscosity of an insulation oil) without deteriorating the inherent properties thereof.

This invention provides molded polypropylene products characterized in that those polypropylenes having the isotactic pentad fraction of the boiling heptane insoluble portion of about 0.955 or more and the content of the boiling heptane soluble portion of about 2.0 to 9.0% by weight are employed.

DETAILED DESCRIPTION OF THE INVENTION

By using the polypropylenes defined above, it is possible to produce stretched films of high stiffness on a commercial scale with ease, without special stretching and the addition of any modifying agents. With cast (unstretched) films and substantially unstretched products such as extruded sheets, which are produced from the polypropylene in this invention, the stiffness is high as compared with those prepared from the polypropylenes conventionally employed. Surprisingly, when they are subjected to stretching and orientation, products of high stiffness can be obtained which could not be expected from the difference in stiffness between the known unstretched and stretched products.

The use of the polypropylene of this invention enables the production of electrical equipment in which the swelling and the increase in thickness of the polypropylene layer due to the swelling are small, and further in which the increase in the viscosity of the insulation oil is small. The molded products produced from the polypropylenes in this invention have greatly increased heat resistance as compared with the conventional polypropylenes and maintain these excellent properties in applications where they are used at relatively high temperatures.

Furthermore, the polypropylenes of this invention have good molding property in laminating on a kraft paper, in producing a polypropylene film, and in extruding a sheet, and its stretching property in producing a biaxially stretched film is excellent.

The isotactic pentad fraction of the boiling heptane insoluble portion, the content of the boiling heptane solution portion and the intrinsic viscosity of polymer soluble in 20° C. xylene, as used in this specification are determined as follows:

5 g of polypropylene is completely dissolved in 500 ml of boiling xylene and after reducing the temperature to 20° C., the solution is allowed to stand for 4 hours. Then, the solution is filtered and a 20° C. xylene insoluble portion is separated. The filtrate is condensed and solidified by evaporating the xylene, dried under reduced pressure at 60° C. to obtain the polymer soluble in xylene at 20° C. The intrinsic viscosity of the polymer is measured in tetralin at 135° C. to obtain the intrinsic viscosity.

The 20° C. xylene insoluble portion is dried and then subjected to Soxhlet extraction using boiling n-heptane for 8 hours. The resulting extraction residue is the boiling heptane insoluble portion.

The content of the boiling heptane soluble portion is calculated from the following equation:

$$\frac{W_1 - W_2}{W_1} \times 100$$

wherein $W_1$ is the weight of a sample (in this case, $W_1 = 5$ g) and $W_2$ is *the sum of* the dry weight of the boiling heptane [soluble] *insoluble* portion *and that of the polymer portion which is soluble in xylene at 20° C.*

The isotactic pentad fraction is measured by use of $^{13}$C-NMR spectrum as described in Zambell et al, Macromolecules 6,925 (1973). This is a fraction of a central propylene monomer unit in which five propylene monomers are bonded, in sequence, in the meso configuration. The assignment of the NMR absorption peak is determined as described in Macromolecules 8, 687 (1975) which is incorporated herein by reference. In more detail, the isotactic pentad fraction is measured as a fraction of the area of a mmmm peak to the total area of all absorption peaks in the methyl carbon region of the $^{13}$C-NMR spectrum.

The isotactic pentad fraction of an NPL standard sample, CRM No. M19-14 Polypropylene PP/MWD/2, in British National Physical Laboratory measured by this method was 0.944.

In this invention, the isotactic pentad fraction of the boiling heptane insoluble portion should be at least about 0.955. Those polypropylenes having the isotactic pentad fraction of less than 0.955 are inferior in the swelling property, stiffness and heat resistance like conventional polypropylenes on the market. When the isotactic pentad fraction is less than 0.955, no effect of this invention can be obtained even if the content of the boiling heptane soluble portion is in the range of about 2.0 to 9.0% by weight. In this invention the isotactic pentad fraction of the boiling heptane insoluble portion is preferably at least about 0.96.

The content of the boiling heptane soluble portion should be about 2.0 to 9.0% by weight. Even if the isotactic pentad fraction of the boiling heptane insoluble portion is more than 0.955, when the content of the boiling heptane soluble portion is above 9.0% by weight, the degree of swelling and the increase in the viscosity of the insulation oil are quite large, and thus the objects and effects of this invention cannot be achieved. On the other hand, with those polypropylenes in which the content of the boiling heptane soluble portion is below 2.0% by weight, working properties in laminating on a kraft paper, producing a film and extruding a sheet, or stretching properties in producing an biaxially stretched film are bad. Thus, no polypropylene layer or polypropylene film having a good thickness distribution can be obtained by those molding procedures usually employed on a commercial scale. This is a serious problem in the application of electrical equipment where a uniform thickness is especially required. The content of the boiling heptane soluble portion is preferably about 3.5 to 8.0% by weight.

In using the molded polypropylene products of this invention for electrical insulation, the intrinsic viscosity of the polymer soluble in 20° C. xylene is preferably not more than about 1.0 dl/g. With those polypropylenes having an intrinsic viscosity of more than 1.0 dl/g, the increase in the viscosity of the insulation oil is as large as with conventional polypropylenes on the market, and electrical equipment of good capability cannot be obtained. More particularly, the intrinsic viscosity of the polymer soluble in 20° C. xylene is not more than about 0.5 dl/g.

Where the molded polypropylene product of this invention is a stretched film, particularly a biaxially stretched film, it is preferred that in the equation for the melt swelling ratio (SR):

$$SR = 0.12\ (\log MFR)^2 + 0.19 \log MFR + c$$

C is in the range of about 1.15 to 1.45.

In the equation the melt swelling ratio (SR) is the ratio of the diameter of an extruded product to the orifice diameter used in measuring melt flow rate (MFR) at 230° C. and at a test load of 2.16 kg by JIS K-7210.

$$SR = \frac{\text{Diameter of Extruded Product}}{\text{Orifice Diameter}}$$

When C is more than 1.45, a variation or change in the amount of a sheet extruded takes place and films having an even thickness cannot be obtained. On the other hand, when C is less than 1.15, the power required for extrusion of a sheet increases and moreover, unevenness or surge of the surface of a sheet results. Thus, in any case, no stretched film having good thickness distribution and good optical properties can be obtained.

Propylenes for use in this invention can be produced by polymerizing propylene at a temperature below 80° C. for about 1 to 12 hours in an inert solvent or by polymerizing liquid propylene or gaseous propylene in the presence of a catalyst comprising (a) a titanium trichloride composition, which is produced by reducing titanium tetrachloride with an organic aluminum compound and activating, successively or simultaneously, with ethers and a halogen compound, and (b) dialkyl aluminum halide.

As component (a) of the catalyst, a titanium trichloride composition disclosed in U.S. Application Ser. No. 920,888, filed June 30, 1978, abandoned for example, is preferably used. As component (b), diethyl aluminum chloride is preferably used. As a third component in addition to components (a) and (b), a Lewis base is optionally used. The use of a Lewis base generally decreases the content of the boiling heptane soluble portion, but does not change the isotactic pentad fraction of the boiling heptane insoluble portion.

The content of the boiling heptane soluble portion can also be decreased by washing polypropylene with an organic solvent such as hexane, heptane, toluene and the like. The higher washing temperature, the longer washing time and the stronger solvent power make the content of the boiling heptane soluble portion smaller. However, the isotactic pentad fraction of the boiling heptane insoluble portion is not affected by washing. Both the content of the boiling heptane soluble portion and the isotactic pentad fraction of the boiling heptane insoluble portion vary depending on polymerization temperature. The higher the polymerization temperature, the higher the content of the boiling heptane soluble portion is, but the lower the isotactic pentad fraction of the boiling heptane insoluble portion is. For this reason the polypropylene produced by polymerizing propylene at temperature higher than 80° C. cannot be used in the present invention even if the catalyst system disclosed in U.S. Application Ser. No. 920,888 abandoned is used.

The molded products of this invention can be produced by molding the above polypropylenes by a hitherto known molding procedure such as injection molding, extrusion molding, hollow molding, etc. These molded polypropylene products are superior in mechanical strength, heat resistance, oil resistance, etc., to hitherto known molded polypropylene products. Particularly, when they are used as stretched films or in such special applications as electrical insulation, excellent characteristics are exhibited.

The term "stretched polypropylene film" as herein used means a monoaxially stretched film and a biaxially stretched film molded by a successive biaxial stretching method and a simultaneous stretching method. In particular, a biaxially stretched film is preferred.

The stretched polypropylene film of this invention has markedly high stiffness and is free from any deterioration in optical and electrical properties. Therefore, the use of the stretched polypropylene film of this invention enables one to avoid increasing the film thickness in the applications where increasing the film thickness has been required to compensate for the stiffness. Thus, the economic merit is large, and the stretched polypropylene film of this invention can be used in the applications where the use of polypropylene films has been greatly limited.

Since the stretched polypropylene film of this invention is superior in mechanical properties, such as tensile strength and so on, heat resistance, oil resistance, heat shrinkable ratios and scratch resistance (difficulty with which the surface of the film is scratched) to the stretched films produced from conventionally used polypropylenes, and it is suitable for use in packaging and in electrical components. Furthermore, it can find wide use in applications where the above-described properties are required.

The use of the stretched polypropylene film of this invention in combination with other materials gives composites having the preferred characteristics because of the high stiffness thereof. For example, in using a biaxially stretched polypropylene film for packaging, it is, in many cases, used as a laminated film in which an easily heat-sealable propylene-α-olefin copolymer layer is laminated on the stretched polypropylene film for the purpose of providing heat-sealability. The use of the biaxially stretched polypropylene film of this invention as a base layer provides composite films which are of high stiffness and suitable for use in automatic packaging.

The molded products of polypropylene of this invention can be widely used in various electrical devices and can be suitably used in cables, condensers (so-called OF cables and OF condensers), etc., wherein the insulation oil is used in combination therewith. In these oil-filled electrical components, mineral oil or synthetic oil such as alkylbenzene, alkylnaphthalene, diaryl ethane, etc., is generally used as an insulation oil, and the polypropylene of this invention exhibits excellent oil resistance to these insulation oils.

In the above electrical components, the polypropylene of this invention can be used as a film or polypropylene laminated paper wherein a polypropylene film is laminated on a fibrous paper such as a kraft paper. As the polypropylene film, any of an unstretched film and a mono- or biaxially stretched film can be used, and in general, the stretched film is preferably used because of its excellent oil resistance. Each of these films can be produced by a conventional molding procedure with attention so as not to deteriorate its electrical properties.

The polypropylene laminated paper can be produced by laminate-molding polypropylene on a fibrous paper such as a kraft paper or by superposing a polypropylene film on a fibrous paper or sticking them together.

By using the polypropylene, electrical equipment having good oil resistance can be produced without using a laminated paper of special structure and without applying any heat treatment under specific conditions. As a matter of course, however, these specific methods can be combined with the present invention, if desired.

The melt flow rate (measured at a temperature of 230° C. and a load of 2.16 kg by JIS K-7210) of polypropylene for use in production of the molded products of this invention is not subject to any special limitations. In general, however, the range of 0.2 to 100 g/10 min. is preferred, with the range of 0.5 to 50 g/10 min. being more preferred.

The polypropylenes for use in this invention can contain, as necessary, a heat stabilizer, an antioxidant, an ultraviolet ray absorbing agent, an antiblocking agent, a colorant, a lubricant, and other additives. And depending on the object, a styrene hydrocarbon polymer, glycerin esters of rosin, and a modifying agent such as a lubricant can be added. Furthermore, a filler such as talc, a glass fiber and the like can be added.

The following examples and comparative examples are given to illustrate embodiments of this invention although this invention is not limited by them.

In these examples, the characteristic values were measured by the methods set forth below:

| | |
|---|---|
| (1) Haze | ASTM D1003 |
| (2) Young's Modulus | ASTM D882 |
| (3) Tensile Strength | ASTM D638 |
| (4) Vicat Softening Point | ASTM D1525 |
| (5) Stiffness | ASTM D747 |
| (6) Heat Shrinkability | Measured at 150° C. by ASTM D1204. |

(7) Degree of Swelling

Calculated from the equation: $(W/Wo-1)\times 100$ wherein W is the weight after being dipped in xylene for 40 hours, and Wo is prior to the dipping.

(8) Amount of Dissolved Polymer

Calculated from the equation: $(Ws/Wo)\times 100$ wherein Ws is the weight of the polymer which is obtained by dipping a sample in xylene for 40 hours, evaporating the xylene and drying the residue at 60° C. under reduced pressure, and Wo is the weight of the sample.

(9) Viscosity of Dissolved Polymer

Intrinsic viscosity of the dissolved polymer, which is obtained in (8), in tetralin at 135° C.

Example 1 and Comparative Example 1

(A) Production of Solid Titanium Trichloride Catalyst

The atmosphere is a 300 ml of four-necked flask equipped with a stirrer and a dropping funnel was sufficiently replaced by argon. 10 ml of titanium tetrachloride, 100 ml of toluene and then 15.5 ml of di-n-butyl ether were added thereto. This solution was kept at 25° C. Thereafter, 5.7 ml of diethylaluminum chloride and 15 ml of toluene were charged in the dropping funnel, and the resulting solution was added, over a 30 minute period, to the mixed solution of titanium tetrachloride and di-n-butyl ether in the flask. After the addition was finished, the reaction solution was stirred at 25° C. for an additional 2.5 hours. The content of $Ti^{4+}$ and $Ti^{3+}$ in the resulting liquid reaction product was measured, and 100% $Ti^{3+}$ alone (based on 1 mole of titanium tetrachloride charged) was detected. Completion of the reduction was thus confirmed. After stirring further for 30 minutes thereafter, 2.31 g of iodine was added to the solution, and the temperature of the reaction solution was increased to 100° C. over a 1 hour period, followed by stirring at 100° C. for 1 hour additionally. Separation, washing and drying under reduced pressure were then carried out to obtain 14.5 g of a solid titanium trichloride catalyst.

The composition and specific surface area of this solid titanium trichloride catalyst were as follows: aluminum: 0.72% by weight (converted to an aluminum chloride basis); di-n-butyl ether: 8.7% by weight; iodine: 0.65% by weight; and specific surface area: 5 $m^2/g$.

(B) Polymerization of Propylene

After the air in a 200 liter polymerization reactor equipped with a stirrer was replaced by propylene, 60 kg of liquid propylene, 60 g of diethylaluminum chloride and 1.1 g of the solid titanium trichloride catalyst obtained in (A) were introduced therein and stirred at 65° C. for 4 hours in the presence of hydrogen.

The resulting polymer slurry was transferred to a 200 l autoclave in which 0.5 l of isobutanol and 0.5 l of propylene oxide had been placed, stirred at 65° C. for 30 minutes, and allowed to stand, and then the supernatant solution was withdrawn. In this autoclave, 60 kg of liquid propylene was introduced, and it was stirred for 30 minutes and allowed to stand. Then, the supernatant solution was withdrawn.

This procedure was repeated three times, and purified polypropylene was obtained on drying.

The polypropylene obtained in (B) had a melt flow rate of 2.0, an isotactic pentad fraction of the boiling heptane insoluble portion of 0.965, a content of the boiling heptane soluble portion of 6.8% by weight, and an intrinsic viscosity of the polymer soluble in xylene at 20° C. of 0.30 dl/g.

(C) Oil Resistance

To the polypropylene obtained in (B) was added 0.1% by weight of a phenol type stabilizer. The resulting mixture was then pressed by use of a heat press molding apparatus to form a sheet of a thickness of 0.5 mm.

With thus formed sheet, the tensile yield strength at 20° C., with vicat softening point and the oil resistance (degree of swelling) in xylene at 100° C. were measured. The results obtained are shown in Table 1.

For comparison, a commercially available polypropylene, Sumitomo Novlen FS 2011A produced by Sumitomo Chemical Co., was analyzed and the test of oil resistance was conducted. The results obtained are shown in Table 1.

TABLE 1

| | Example 1 | Comparative Example 1 |
|---|---|---|
| Melt Flow Rate (g/10 min.) | 2.0 | 2.1 |
| Isotactic Pentad Fraction of Boiling Heptane Insoluble Portion | 0.965 | 0.945 |
| Content of Boiling Heptane Soluble Portion (% by weight) | 6.8 | 7.0 |
| Intrinsic Viscosity of Polymer Soluble in 20° C. Xylene (dl/g) | 0.30 | 1.4 |
| Melting Point (°C.) | 166.5 | 164.2 |
| Vicat Softening Point (°C.) | 97 | 90 |

TABLE 1-continued

| | Example 1 | Comparative Example 1 |
|---|---|---|
| Yield Strength ($kg/cm^2$) | 355 | 325 |
| Stiffness ($kg/cm^2$) | 14,000 | 12,000 |
| Degree of Swelling (%) | 24 | 43 |
| Amount of Dissolved Polymer (wt %) | 1.9 | 2.4 |
| Viscosity of Dissolved Polymer (dl/g) | 0.16 | 0.35 |

Example 2 and Comparative Example 2

To each of the same polypropylenes in Example 1 and Comparative Example 1 (SR was respectively 1.35 and 1.40) was added 0.2% by weight of a phenol type stabilizer. The resulting mixture was melt-extruded at 280° C. by use of a T die extrusion apparatus with a screw diameter of 65 mm and quickly cooled by use of cooling rolls at 35° C. to obtain a sheet having a thickness of about 1 mm.

The thus obtained sheet was stretched four times in the longitudinal direction while heating at 140° C. and stretched eight times in the lateral direction while heating with hot air at 160° C. Then, it is subjected to stretch heat treatment at 150° C. for 5 seconds. An about 30μ thick biaxially stretched film was obtained.

The characteristics of this film are shown in Table 2.

The biaxially stretched film of this invention is superior in stiffness (Young's modulus), tensile strength, heat shrinkability and oil resistance to that of the comparative example.

Using 30μ thick cast films produced from the above polypropylenes at 280° C., the Young's modulus was measured, and the results obtained are shown in Table 2. With these cast films, there cannot be found so large difference in stiffness as in stretched films.

TABLE 2

| | Example 2 | Comparative Example 2 |
|---|---|---|
| Extrusion Characteristics and Stretching Property | Good | Good |
| Characteristic Values of Biaxially Stretched Film | | |
| Haze (%) | 0.7 | 0.6 |
| Young's Modulus (TD $kg/cm^2$)* | 41,000 | 29,000 |
| Tensile Strength (TD $kg/cm^2$) | 2,300 | 2,000 |
| Heat Shrinkability (TD %) | 19 | 25 |
| Degree of Swelling (%) | 6 | 11 |
| Characteristic Value of Unstretched Film | | |
| Young's Modulus (TD $kg/cm^2$) | 7,700 | 7,400 |

TD is transverse direction.

Examples 3–5 and Comparative Examples 3–7

The procedure of Example 1 was repeated wherein the resin to be used as a starting material was changed. The extrusion property, stretching property, and the haze and Young's modulus of biaxially stretched film were measured. The results obtained are shown in Table 3.

TABLE 3

| | Melt Flow Rate (g/10 min) | Melt Expansion Ratio | Isotactic Pentad Fraction of Boiling Heptane Soluble Portion | Content of Boiling Heptane Soluble Portion (wt %) | Extrusion Property | Stretching Property | Haze (%) | Young's Modulus (TD $kg/cm^2$) |
|---|---|---|---|---|---|---|---|---|
| Example 3 | 4.5 | 1.58 | 0.970 | 5.0 | Good | Good | 0.8 | 43,500 |
| Example 4 | 2.1 | 1.41 | 0.955 | 3.1 | " | " | 0.9 | 42,000 |
| Example 5 | 0.8 | 1.17 | 0.960 | 8.5 | " | " | 0.6 | 39,000 |

TABLE 3-continued

| | Melt Flow Rate (g/10 min) | Melt Expansion Ratio | Isotactic Pentad Fraction of Boiling Heptane Soluble Portion | Content of Boiling Heptane Soluble Portion (wt %) | Extrusion Property | Stretching Property | Haze (%) | Young's Modulus (TD kg/cm$^2$) |
|---|---|---|---|---|---|---|---|---|
| Comparative | | | | | | | | |
| Example 3 | 2.3 | 1.35 | 0.955 | 1.2 | Good | Good | 0.5 | 30,000 |
| Example 4 | 2.1 | 1.30 | 0.960 | 1.5 | " | Bad (breakdown and uneven stretching) | 11.3 | Impossible to measure |
| Example 5 | 2.2 | 1.36 | 0.950 | 7.0 | " | Good | 0.6 | 29,500 |
| Example 6 | 4.0 | 1.65 | 0.951 | 7.2 | Bad (large change in the amount extruded, uneven thickness, impossible to stretch) | | — | — |
| Example 7 | 2.0 | 1.15 | 0.960 | 7.1 | Bad (surge on surface of sheet, no film with good thickness distribution) | | — | — |

Example 6 and Comparative Example 8

Each of the same polypropylene as used in Example 2 and Comparative Example 2 was molded by the same method as used in Example 2 to provide an about 500μ thick sheet.

On the thus obtained sheet, a crystalline propylene-ethylene random copolymer having an ethylene content of 4.0% by weight was melt-extruded and laminated in a thickness of 50μ.

The thus obtained sheet was stretched five times in both the longitudinal direction and lateral direction at the same time by use of a biaxial stretching apparatus while heating at 150° C., and it was then subjected to a stretch heat treatment to thereby obtain a 22μ biaxially stretched composite film.

The characteristics of these films were measured and the results obtained are shown in Table 4.

TABLE 4

| | Stretching Property | Haze (%) | Young's Modulus (TD kg/cm$^2$) |
|---|---|---|---|
| Example 6 | Good | 1.5 | 27,000 |
| Comparative Example 8 | Good | 1.7 | 19,000 |

Examples 7–9 and Comparative Examples 9–11

The procedure of Example 1 was repeated wherein the resin to be used as a starting material was changed. The oil resistance, and the biaxial stretching property and laminate workability were tested. The results obtained are shown in Table 5.

With all of these samples, the extrusion characteristics and biaxial stretching property were good.

TABLE 5

| | Melt Flow Rate (g/10 min) | Isotactic Pentad Fraction | Content of Boiling Heptane Soluble Portion (wt %) | Intrinsic Viscosity of 20° C. Xylene Soluble Portion | Degree of Swelling (%) | Amount of Dissolved Polymer (wt %) | Viscosity of Dissolved Portion | Workability: Biaxial Stretching Property | Workability: Laminate Workability |
|---|---|---|---|---|---|---|---|---|---|
| Example 7 | 2.1 | 0.955 | 3.1 | 0.35 | 22 | 1.8 | 0.11 | Good | — |
| Example 8 | 0.8 | 0.960 | 8.5 | 0.60 | 26 | 2.8 | 0.16 | " | — |
| Example 9 | 50 | 0.970 | 5.0 | 0.25 | 16 | 2.5 | 0.10 | — | Good |
| Comparative Example 9 | 2.3 | 0.955 | 12 | 1.3 | 39 | 4.0 | 0.30 | Good | — |
| Example 10 | 2.1 | 0.960 | 1.5 | 1.5 | 17 | 2.1 | 0.53 | Bad (great uneven in thickness, bad stretching) | — |
| Example 11 | 40 | 0.950 | 7.0 | 0.9 | 36 | 2.9 | 0.35 | — | Good |

EXAMPLE 10 and Comparative Example 12

Five sheets of 50μ thick biaxially stretched polypropylene films, which had been produced from each of the same polypropylenes as in Example 1 and Comparative Example 1, and five sheets of 50μ thick kraft insulative papers as fibrous paper were superposed alternately on each other. The thus obtained laminated products were dipped in an insulation oil (xylene at 100° C.) for 40 hours. After that, the increase in thickness was compared.

The ratio of the increase in thickness (ratio of the increase in thickness after dipping to the original thickness prior to dipping) was 11% in the comparative product, whereas in the product of this invention, 6%. Thus, with the product of this invention, it can be seen that the increase in thickness due to the swelling of the insulation oil was reduced.

Example 11 and Comparative Example 13

The same polypropylenes as used in Example 9 and Comparative Example 11 were tested as follows:

Two sheets of 50μ thick kraft insulative papers were laminated by melt-extruding each of the polypropylenes to give a 250μ thick polypropylene laminated paper.

The thus obtained laminated papers were dipped in an insulation oil (hard type alkylbenzene at 100° C.) for 40 hours, and the rate of increase in thickness was measured.

The ratio of increase in thickness was 16% in the comparative product, whereas in the product of this invention it was 9%.

While the invention has been described in detail and with reference to specific embodiments thereof, it will be apparent to one skilled in the art that various changes and modifications can be made therein without departing from the spirit and scope thereof.

What is claimed is:

1. A stretched film, for use in electrical insulation, prepared from a polypropylene having an isotactic pentad fraction of the boiling heptane insoluble portion of at least about 0.955 and a content of the boiling heptane soluble portion of about 2.0 to 9.0% by weight.

2. The stretched film of claim 1, wherein the isotactic pentad fraction is not less than about 0.960.

3. The stretched film of claim 1, wherein the content of the boiling heptane soluble portion is about 3.5 to 8.0% by weight.

4. The stretched film of claim 1, wherein the intrinsic viscosity of the polymer soluble in xylene at 20° C. contained in said polypropylene is not more than about 1.0 dl/g.

5. The stretched film of claim 4, wherein the intrinsic viscosity of the polymer soluble in xylene at 20° C. is not more than about 0.5 dl/g.

6. The stretched film of claim 1, wherein in the equation for the melt swelling ratio of the polypropylene (SR), $SR=0.12\ (\log MFR)^2+0.19 \log MFR+C$ wherein MFR is a melt flow rate of the polypropylene, and C is about 1.5 to 1.45.

7. The stretched film of claim 6, wherein C is about 1.20 to 1.40.

8. The stretched film of claim 6, wherein MFR is about 0.2 to 100.

9. The stretched film of claim 9, wherein MFR is about 0.5 to 50.

10. The stretched film of claim 1, wherein the stretched film is a biaxially stretched film.

11. The stretched film of claim 1, wherein the polypropylene is one having an isotactic pented fraction of the boiling heptane insoluble portion of at least about 0.955, a content of the boiling heptane soluble portion of about 2.0 to 9.0% by weight, and an intrinsic viscosity of the polymer soluble in xylene at 20° C. of not more than about 1.0 dl/g.

12. A laminated paper, for use in electrical insulation, produced by laminating a polypropylene, having an isotactic pentad fraction of the boiling heptane insoluble portion of at least about 0.955 and a content of the boiling heptane solution portion of about 2.0 to 9% by weight, on a fibrous paper.

13. The laminated paper of claim 12, wherein the isotactic pentad fraction is not less than about 0.960.

14. The laminated paper of claim 12, wherein the content of the boiling heptane solution portion is about 3.5 to 8.0% by weight.

15. The laminated paper of claim 12, wherein the intrinsic viscosity of the polymer soluble in xylene at 20° C. contained in said polypropylene is not more than about 1.0 dl/g.

16. The laminated paper of claim 15, wherein the intrinsic viscosity of the polymer soluble in xylene at 20° C. is not more than about 0.5 dl/g.

17. The laminated paper of claim 12, wherein in the equation for the melt swelling ratio of the polypropylene (SR), $SR=0.12\ (\log MFR)^2+0.19 \log MFR+C$ wherein MFR is a melt flow rate of the polypropylene, and C is about 1.15 to 1.45.

18. The laminated paper of claim 17, wherein C is about 1.20 to 1.40.

19. The laminated paper of claim 17, wherein MFR is about 0.2 to 100.

20. The laminated paper of claim 19, wherein MFR is about 0.5 to 50.

21. The laminated paper of claim 12, wherein the polypropylene has an isotactic pentad fraction of the boiling heptane insoluble portion of at least about 0.955, a content of the boiling heptane solution portion of about 2.0 to 9.0% by weight, and an intrinsic viscosity of the polymer soluble in xylene at 20° C. of not more than about 1.0 dl/g.

* * * * *